US012030318B2

(12) United States Patent
Takahashi et al.

(10) Patent No.: US 12,030,318 B2
(45) Date of Patent: Jul. 9, 2024

(54) LIQUID DISCHARGE APPARATUS, LIQUID CONTAINER, AND CLEANING BOTTLE

(71) Applicants: Kenta Takahashi, Kanagawa (JP); Takeyuki Kobayashi, Kanagawa (JP); Kazuyoshi Matsumoto, Tokyo (JP)

(72) Inventors: Kenta Takahashi, Kanagawa (JP); Takeyuki Kobayashi, Kanagawa (JP); Kazuyoshi Matsumoto, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 8 days.

(21) Appl. No.: 17/701,681

(22) Filed: Mar. 23, 2022

(65) Prior Publication Data

US 2022/0305797 A1 Sep. 29, 2022

(30) Foreign Application Priority Data

Mar. 25, 2021 (JP) ................................. 2021-051104

(51) Int. Cl.
*B41J 2/175* (2006.01)

(52) U.S. Cl.
CPC ....... *B41J 2/17506* (2013.01); *B41J 2/17503* (2013.01); *B41J 2/17509* (2013.01); *B41J 2/17513* (2013.01); *B41J 2/17523* (2013.01); *B41J 2/17553* (2013.01)

(58) Field of Classification Search
CPC .... B41J 2/175; B41J 2/17503; B41J 2/17506; B41J 2/17509; B41J 2/17513; B41J 2/17523; B41J 2/17553
See application file for complete search history.

(56) References Cited

U.S. PATENT DOCUMENTS

| | | | | |
|---|---|---|---|---|
| 11,298,945 | B2 * | 4/2022 | Yashiro | B41J 2/17509 |
| 11,433,677 | B2 * | 9/2022 | Omura | B41J 2/175 |
| 2007/0109362 | A1 | 5/2007 | Hori et al. | |
| 2014/0104349 | A1 * | 4/2014 | Kimura | B41J 25/001 347/85 |
| 2016/0325550 | A1 | 11/2016 | Masaoka et al. | |
| 2017/0246879 | A1 * | 8/2017 | Kudo | B41J 2/17513 |
| 2019/0184709 | A1 | 6/2019 | Hasebe et al. | |
| 2019/0255854 | A1 | 8/2019 | Asano et al. | |
| 2020/0079091 | A1 | 3/2020 | Takahashi et al. | |
| 2020/0307244 | A1 * | 10/2020 | Ozawa | B41J 2/16552 |
| 2021/0291533 | A1 * | 9/2021 | Yokomaku | B41J 2/175 |
| 2021/0394516 | A1 | 12/2021 | Takahashi | |

FOREIGN PATENT DOCUMENTS

| | | |
|---|---|---|
| JP | 2005-059490 | 3/2005 |
| JP | 2017-205895 | 11/2017 |

* cited by examiner

*Primary Examiner* — Anh T Vo
(74) *Attorney, Agent, or Firm* — XSENSUS LLP

(57) ABSTRACT

A liquid discharge apparatus includes multiple heads configured to respectively discharge different types of liquids, and multiple liquid containers configured to respectively contain the different types of liquids to be respectively supplied to the multiple heads. Each of the multiple liquid containers includes a first fitting part fittable to each of: a second fitting part of corresponding one of multiple refill bottles respectively containing the different types of liquids to be respectively supplied to the multiple liquid containers; and a third fitting part of a cleaning bottle containing a cleaning liquid to be commonly supplied to each of the multiple liquid containers.

12 Claims, 12 Drawing Sheets

| | BLACK |
|---|---|
| LIQUID TANK<br>SHAPE OF FIRST FITTING PART |  |
| CLEANING BOTTLE<br>SHAPE OF THIRD FITTING PART |  |

| | BLACK |
|---|---|
| LIQUID TANK<br>SHAPE OF FIRST FITTING PART |   |
| CLEANING BOTTLE<br>SHAPE OF THIRD FITTING PART |   |

| | BLACK |
|---|---|
| LIQUID TANK<br>SHAPE OF FIRST FITTING PART |  |
| CLEANING BOTTLE<br>SHAPE OF THIRD FITTING PART |  |

| | BLACK |
|---|---|
| LIQUID TANK<br>SHAPE OF FIRST FITTING PART |  |
| REFILL BOTTLE<br>SHAPE OF SECOND FITTING PART |  |
| CLEANING BOTTLE<br>SHAPE OF THIRD FITTING PART |  |

LIQUID DISCHARGE APPARATUS, LIQUID CONTAINER, AND CLEANING BOTTLE

CROSS-REFERENCE TO RELATED APPLICATIONS

This patent application is based on and claims priority pursuant to 35 U.S.C. § 119(a) to Japanese Patent Application No. 2021-051104, filed on Mar. 25, 2021, in the Japan Patent Office, the entire disclosure of which is hereby incorporated by reference herein.

BACKGROUND

Technical Field

Aspect of this disclosure relates to a liquid discharge apparatus, a liquid container, and a cleaning bottle.

Related Art

A liquid discharge apparatus such as a printer feeds a liquid from a refill container to a liquid container installed in an apparatus body of the printer to perform continuous printing for a long time.

For example, the liquid container has a liquid inlet, from which a liquid is supplied to the liquid container, and a first fitting part provided around the liquid inlet. The refill container has a liquid outlet to supply a liquid to the liquid container and a second fitting part provided around the liquid outlet. The first fitting part and the second fitting part are fitted to each other so that liquid is supplied from the liquid outlet to the liquid inlet. The first fitting part and the second fitting part have different shapes for each color to prevent color mixture.

SUMMARY

In an aspect of this disclosure, a liquid discharge apparatus includes multiple heads configured to respectively discharge different types of liquids, and multiple liquid containers configured to respectively contain the different types of liquids to be respectively supplied to the multiple heads. Each of the multiple liquid containers includes a first fitting part fittable to each of: a second fitting part of corresponding one of multiple refill bottles respectively containing the different types of liquids to be respectively supplied to the multiple liquid containers; and a third fitting part of a cleaning bottle containing a cleaning liquid to be commonly supplied to each of the multiple liquid containers.

In another aspect of this disclosure, a liquid container includes multiple liquid containers configured to respectively contain different types of liquids to be respectively supplied to multiple heads. Each of the multiple liquid containers includes a container body configured to contain corresponding one of the different types of liquids, and a first fitting part fittable to each of: a second fitting part of corresponding one of multiple refill bottles respectively containing the different types of liquids to be respectively supplied to the multiple liquid containers, and a third fitting part of a cleaning bottle containing a cleaning liquid to be commonly supplied to each of the multiple liquid containers.

In still another aspect of this disclosure, a cleaning bottle includes a bottle body configured to contain a cleaning liquid commonly supplied to each of multiple liquid containers respectively including multiple first fitting parts having different shapes with each other; and a third fitting part attached to the bottle body, the third fitting part commonly fittable to each of the multiple first fitting parts.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 158 is a schematic side view of the liquid tank and the cleaning bottle in the supply operation according to a seventh embodiment;

Figure 1A:
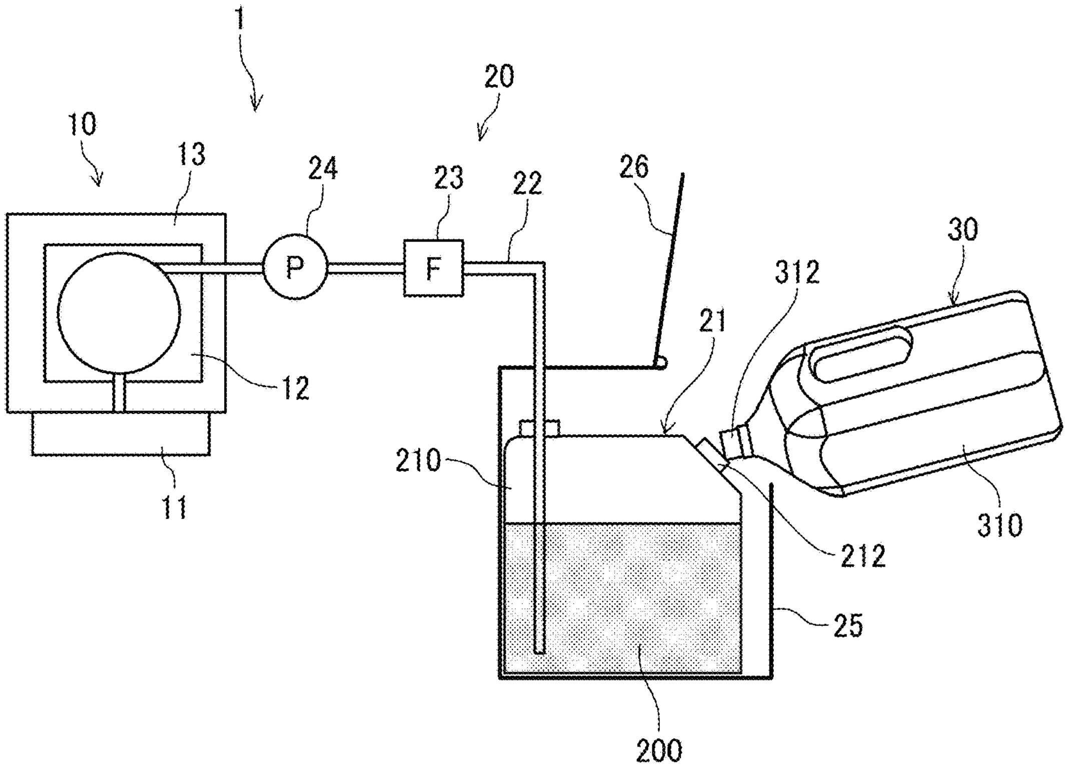
FIGS. 1A and 1B are schematic side views of a part of a printer according to the first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

It will also be understood that when an element is referred to as being "connected" or "coupled" to another element, it can be directly connected or coupled to another element or intervening elements may be present.

In contrast, when an element is referred to as being "directly connected" or "directly coupled" to another element, there are no intervening elements present. Referring now to the drawings, wherein like reference numerals designate identical or corresponding parts throughout the several views, embodiments of the present disclosure are described below.

A liquid discharge apparatus according to a first embodiment of the present disclosure is described with reference to FIGS. 1A and 1B.

Figure 1B:
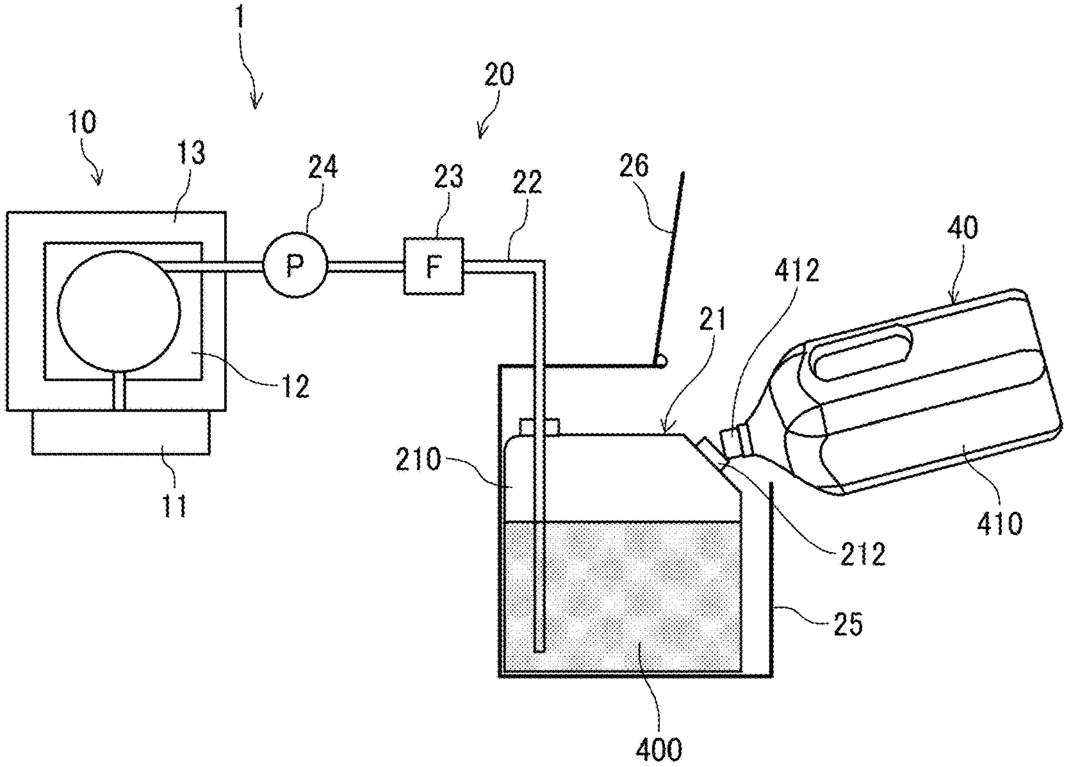

FIGS. 1A and 1B are schematic side views of a part of a printer 1 according to the first embodiment of the present disclosure.

The printer 1 serving as the liquid discharge apparatus includes a liquid discharger 10 and a liquid supply system 20. The liquid discharger 10 discharges a liquid. The liquid supply system 20 supplies a liquid to the liquid discharger 10.

The liquid discharger 10 includes a head 11, a sub tank 12, and a carriage 13. The head 11 serves as a liquid discharge device having a nozzles to discharge a liquid. The sub tank 12 supplies a liquid to the head 11. The carriage 13 mounts the head 11 and the sub tank 12 on the carriage 13. The carriage 13 is reciprocally movable in a main scanning direction parallel to a paper surface. The carriage 13 is reciprocally movable in a horizontal direction orthogonal to the paper surface (in a depth direction to the paper surface).

The liquid supply system 20 supplies a liquid to the head 11. The liquid supply system 20 includes a liquid tank 21 serves as a liquid storage container. Hereinafter, the liquid storage container is simply referred to as a "liquid container". The liquid tank 21 as the liquid container is installed in the housing 25 of the printer 1. The liquid tank 21 stores a liquid. Liquid is supplied from the liquid tank 21 to the head 11 via a liquid supply path 22. The liquid supply path 22 includes a filter 23 and a liquid feed pump 24 serving as a liquid feeder.

A housing 25 contains the liquid tank 21 inside the housing 25. The housing 25 includes an openably closable cover 26.

The liquid container may not be a replaceable container detachably attachable to the housing 25 of the printer 1 such as the liquid tank 21. The liquid container may be fixed to the housing 25 so that the liquid container and the housing 25 form a single body.

The liquid tank 21 is replenished with ink 200 as a liquid from a refill bottle 30 serving as a refill container as illustrated in FIG. 1A when an amount ink 200 decreases.

In the printer 1 using liquid, a replacement operation is performed when a color arrangement of ink is changed, when the printer 1 is stored and not used for printing for a long time, or when the printer 1 is transported, for example. The replacement operation replaces the ink 200 in a liquid path such as the liquid supply path 22 in the printer 1 with the cleaning liquid 400 (or storage liquid).

Therefore, in the printer 1 (liquid discharge apparatus) according to the first embodiment, the liquid tank 21 is emptied and refilled with the cleaning liquid 400 from a cleaning bottle 40 serving as a cleaning container.

Next, a liquid tank 21 serving as a liquid container according to a first embodiment of the present disclosure is described with reference to FIG. 2.

Figure 2A:
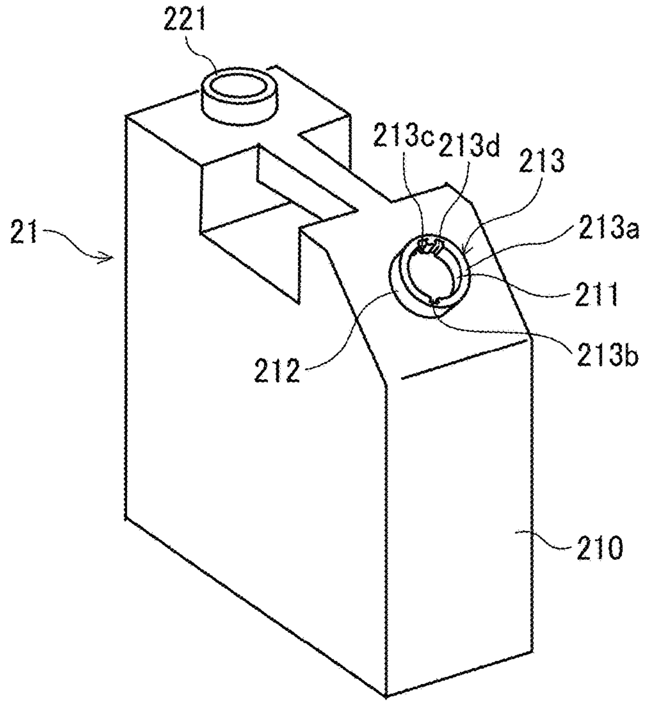
FIGS. 2A and 2B are schematic perspective view of a liquid tank and a partial plan view of a first fitting part according to the first embodiment of the present disclosure.
Figure 2B:
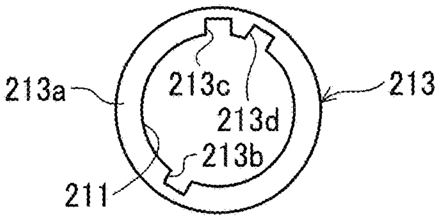

FIGS. 2A and 2B are schematic perspective view of the liquid tank 21 and a partial plan view of the first fitting part 213 according to the first embodiment of the present disclosure.

FIG. 2A is an external schematic perspective view of the liquid tank 21 according to the first embodiment of the present disclosure.

FIG. 2B is a plan view of a fitting shape of the first fitting part 213.

The liquid tank 21 includes a tank body 210 (container body) to contain (store) a liquid. The tank body 210 (container body) includes an inlet part 212, a first fitting part 213, and a supply port 221. The inlet part 212 forms an inlet 211 from which a liquid in a refill bottle 30 (see FIG. 3A) is injected (supplied) inside the tank body 210. A liquid is supplied from the supply port 221 to a liquid supply path 22.

The first fitting part 213 includes the inlet part 212 including a cylindrical part 213*a* and three recesses 213*b*, 213*c*, and 213*d* recessed in a radial direction from an inner wall the cylindrical part 213*a*. Positions in a circumferential direction (circumferential positions) of the recesses 213*b* and 213*c* of the first fitting part 213 are the same for the liquid tanks 21 of each color. Conversely, the circumferential position of the recess 213*d* of the first fitting part 213 is different for the liquid tanks 21 of each color.

Next, the refill bottle 30 serving as a refill container according to the first embodiment of the present disclosure is described with reference to FIGS. 3A and 3B.

Figure 3A:
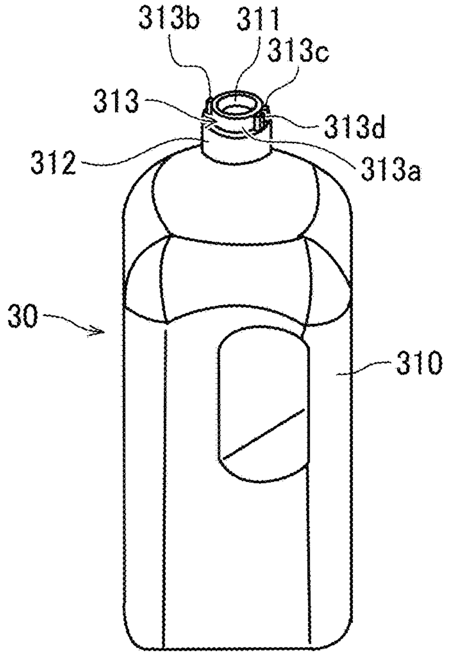
FIGS. 3A and 3B illustrates a refill bottle according to the first embodiment.
Figure 3B:
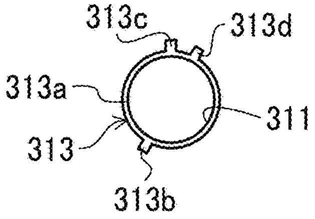

FIGS. 3A and 3B illustrates the refill bottle 30 according to the first embodiment.

FIG. 3A is an external schematic perspective view of the refill bottle 30 according to the first embodiment of the present disclosure.

FIG. 3B is a plan view of a fitting shape of a second fitting part 313 of the refill bottle 30 according to the first embodiment of the present disclosure.

The refill bottle 30 also serves as a refill container. The refill bottle 30 includes a bottle body 310 (container body) for containing ink 200 as a liquid. The bottle body 310 includes an outlet part 312 and a second fitting part 313. The outlet part 312 forms an outlet 311, from which the ink 200 is poured (supplied) outside the bottle body 310.

The second fitting part 313 includes the outlet part 312 and three protrusions 313*b*, 313*c*, and 313*d* protruding in a radial direction from the wall surface of the cylindrical part 313*a* formed together with the outlet part 312 as one body.

Similarly, the protrusions 313*b* to 313*d* of the second fitting part 313 of the refill bottle 30 are respectively fitted into the recesses 213*b* to 2I 3*d* of the first fitting part 213 of a predetermined liquid tank 21. The term "predetermined liquid tank" refers to a liquid tank 21 for storing ink 200, a color of which is identical to a color of the ink 200 stored in the refill bottle 30. That is, a color of ink 200 in the liquid tank 21 corresponds to a color of ink 200 in the refill bottle 30.

Next, shapes of fitting parts of multiple liquid tanks 21 (liquid containers) and the multiple refill bottles 30 (refill containers) according to the first embodiment is described below with reference to FIG. 4.

Figure 4:
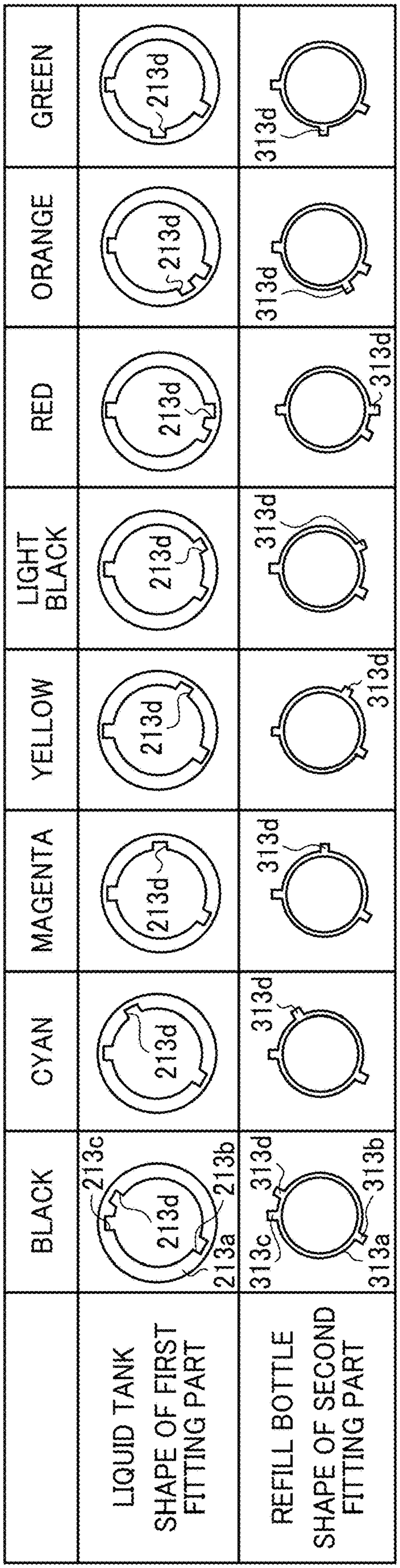
FIG. 4 is a table illustrating the shapes of fitting parts of multiple liquid tanks (liquid containers) and multiple refill bottles (refill containers)

FIG. 4 is a table illustrating the shapes of the fitting parts of the multiple liquid tanks 21 (liquid containers) and the multiple refill bottles 30 (refill containers).

A printer 1 according to the first embodiment includes multiple liquid tanks 21 as multiple liquid containers. Liquids of different types (colors) are stored in the liquid tanks 21, respectively.

As illustrated in FIG. 4, the printer 1 includes eight liquid tanks 21 as the multiple liquid containers configured to contain inks of colors of black (K), cyan (C), magenta (M), yellow (Y), light black (LB), red (R), orange (G), and green (G), for example.

Here, the recesses 213*b* and 2I 3*c* of each of the first fitting parts 213 of the multiple liquid tanks 21 are disposed at the same position in a circumferential direction of the cylindrical part 213*a* for each of the liquid tanks 21 containing the liquid of any color.

On the other hand, the recess 213*d* of each of the first fitting parts 213 of the multiple liquid tanks 21 is disposed at different positions in the circumferential direction of the cylindrical part 213*a* for each of the liquid tanks 21 containing the liquids of respective colors.

Similarly, the refill bottles 30 of respective colors include the second fitting parts 313 including the protrusions 313*b* to 313*d* respectively fitted into the recesses 213*b* to 213*d* of the first fitting parts 213 of the liquid tanks 21 corresponding to the respective colors of the refill bottles 30.

With such as configuration, the first fitting part 213 of the liquid tank 21 is fittable only to the second fitting part 313 of the refill bottle 30 that contains the liquid (ink 200), a type of which is identical to a type of the liquid (ink 200) contained in the liquid tank 21 having the corresponding first fitting part 213. Thus, the first fitting part 213 of the liquid tank 21 is fittable only to the second fitting part 313 of the refill bottle 30 corresponding to the first fitting part 213 of the liquid tank 21.

Thus, when a color of the liquid tank 21 to which the ink 200 is to be supplied is different from a color of the refill bottle 30, the second fitting part 313 of the refill bottle 30 may not be fitted into the first fitting part 213 of the liquid tank 21 of the color different from the color of the refill bottle 30.

Thus, the liquid tank 21 is prevented from being supplied with the ink 200, a color of which is different from a target color, from the refill bottle 30 of a color other than the target color for refilling the liquid tank 21. Thus, the printer 1 prevents color mixture of the inks 200 in the liquid tank 21.

Next, a cleaning bottle 40 serving as a cleaning container according to a first embodiment of the present disclosure is described with reference to FIGS. 5A and 5B, and FIG. 6

Figure 5A:
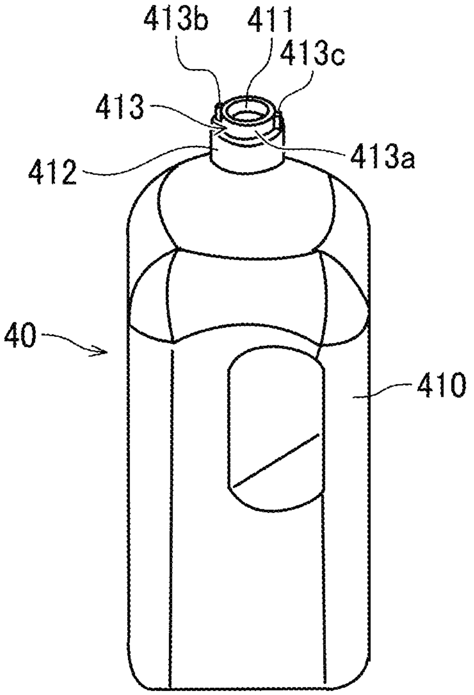
FIGS. 5A and 5B illustrate a cleaning bottle according to the first embodiment of the present disclosure.
Figure 5B:
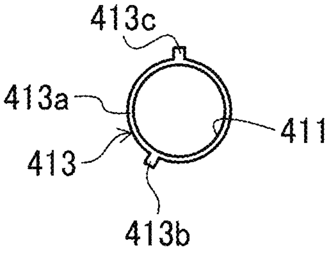

FIGS. 5A and 5B illustrate the cleaning bottle 40 according to the first embodiment of the present disclosure.

FIG. 5A is an external schematic perspective view of the cleaning bottle 40 according to the first embodiment of the present disclosure.

FIG. 5B is a plan view of a fitting shape of a third fitting part 413.

Figure 6:
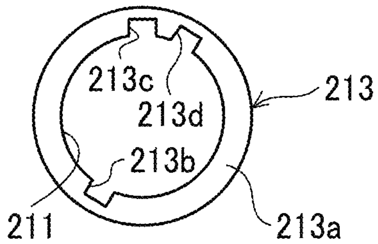
FIG. 6 is a table illustrating a shape of the fitting part of the liquid tank and the cleaning bottle according to the first embodiment.
Figure 6:
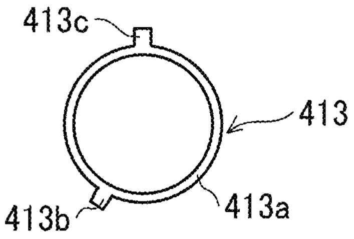

FIG. 6 is a table illustrating a shape of the fitting part of the liquid tank 21 and the cleaning bottle 40 according to the first embodiment.

The cleaning bottle includes a bottle body 410 (container body), an outlet part 412, and a third fitting part 413. The bottle body 410 contains a cleaning liquid 400. The outlet part 412 is formed on the bottle body 410 as one body. The outlet part 412 includes an outlet 411 from which the cleaning liquid 400 is supplied to the liquid tank 21.

The third fitting part 413 has two protrusions 413*b* and 4I 3*c* protruding in the radial direction from the outer wall surface of the cylindrical part 413*a* formed together with the outlet part 412 as one body. The protrusions 413*b* and 413*c* of the third fitting part 413 of the cleaning bottle 40 is fittable into the recesses 213*b* and 213*c* of the first fitting part 213 of the liquid tanks 21 of all colors.

Thus, the first fitting part 213 of the liquid tank 21 is fittable into the third fitting part 413 of the cleaning bottle 40 that contains the cleaning liquid 400 common to all the liquid tanks 21.

Thus, the multiple liquid tanks 21 (liquid containers) is configured to respectively contain the different types of liquids to be respectively supplied to multiple heads 11. The multiple heads 11 is configured to respectively discharge different types of inks 200 (liquids).

Next, a function of the fitting shape of the liquid tank 21 according to the first embodiment is described with reference also to FIG. 7.

Figure 7A:
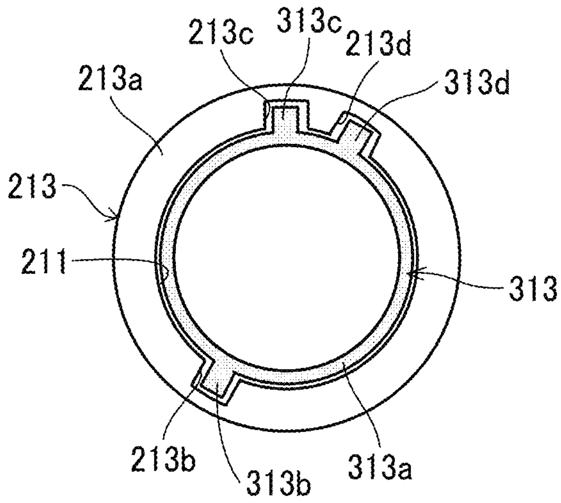
FIGS. 7A and 7B are schematic plan views of a first fitting part of the liquid tank and a second fitting part of the refill bottle in a fitted state, and the first fitting part of the liquid tank and a third fitting part of the cleaning bottle in the fitted state, respectively according to the first embodiment.
Figure 7B:
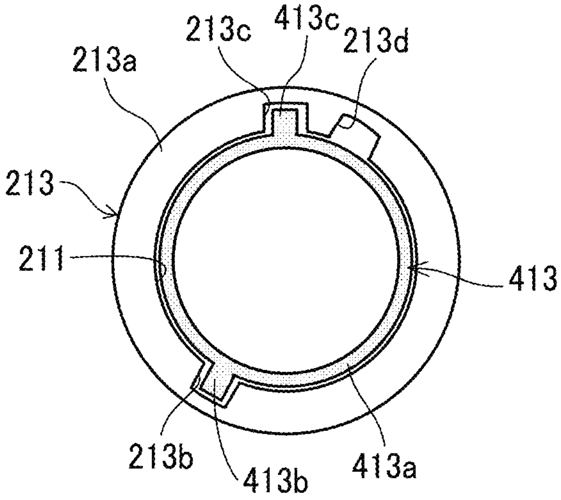

FIGS. 7A and 7B are schematic plan views of the first fitting part 213 of the liquid tank 21 and the second fitting part 313 of the refill bottle 30 in a fitted state, and the first fitting part 213 of the liquid tank 21 and the third fitting part 413 of the cleaning bottle 40 in the fitted state, respectively.

As illustrated in FIG. 7A, the second fitting part 313 of the outlet part 312 of the refill bottle 30 is fittable only to the first fitting part 213 of the predetermined liquid tank 21.

Conversely, the third fitting part 413 of the cleaning bottle 40 is fittable into the recesses 213*b* and 213*c* formed at the same circumferential positions for all the liquid tanks 21 as illustrated in FIG. 7B.

Therefore, when the cleaning liquid 400 is supplied into the liquid tank 21, the cleaning liquid 400 can be supplied from the cleaning bottle 40 common to all the liquid tanks 21 of any color.

Thus, the printer 1 can improve workability of a supply operation of the cleaning liquid to supply cleaning liquid 400 from the cleaning bottle 40 to the liquid tank 21.

The printer 1 (liquid discharge apparatus) according to a second embodiment of the present disclosure is described with reference to FIG. 8 and FIGS. 9A and 9B.

Figure 8:
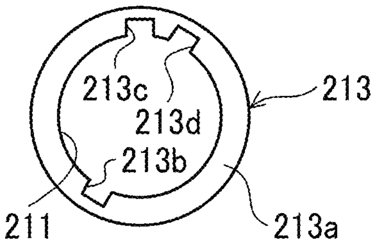
FIG. 8 is a table illustrating a shape of the fitting part of the liquid tank and the cleaning bottle according to a second embodiment.
Figure 8:
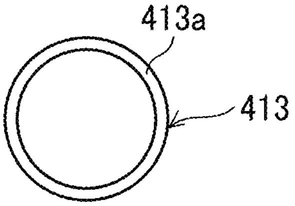

FIG. 8 is a table illustrating a shape of the fitting part of the liquid tank 21 and the cleaning bottle 40 according to the second embodiment.

Figure 9A:
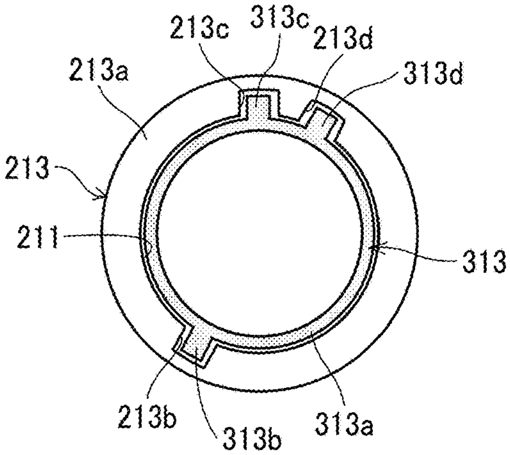
FIGS. 9A and 9B are schematic plan views of the first fitting part of the liquid tank and the second fitting part of the refill bottle in a fitted state, and the first fitting part of the liquid tank and the third fitting part of the cleaning bottle in the fitted state, respectively, according to the second embodiment.
Figure 9B:
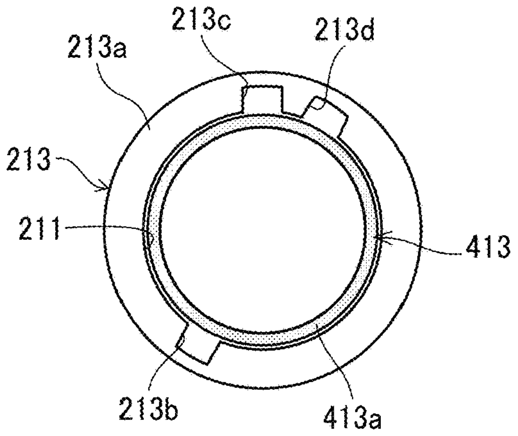

FIGS. 9A and 9B are schematic plan views of the first fitting part 213 of the liquid tank 21 and the second fitting part 313 of the refill bottle 30 in a fitted state, and the first fitting part 213 of the liquid tank 21 and the third fitting part 413 of the cleaning bottle 40 in the fitted state according to the second embodiment.

The printer 1 according to the second embodiment includes the first fitting part 213 of the liquid tank 21 having the inlet 211 itself as a common fitting part. The third fitting part 413 of the cleaning bottle 40 has no protrusion on an outer peripheral surface. The cylindrical part 413*a* is inserted into and fitted into the inlet 211. The cylindrical part 413*a* forms the third fitting part 413 of the cleaning bottle 40.

With such a configuration, the second fitting part 313 of the refill bottle 30 is fittable only into the first fitting part 213 of the predetermined liquid tank 21 as illustrated in FIG. 9A. Conversely, the third fitting part 413 of the cleaning bottle 40 is fittable into the first fitting part 213 of any of the liquid tanks 21 as illustrated in FIG. 9B.

As a result, the same cleaning bottle 40 is used to supply the cleaning liquid 400 to the liquid tanks 21 of all colors. Thus, the printer 1 can improve workability of the supply operation of the cleaning liquid to supply the cleaning liquid 400 from the cleaning bottle 40 to the liquid tank 21.

The printer 1 according to a third embodiment of the present disclosure is described with reference to FIGS. 10 and 11.

Figure 10:
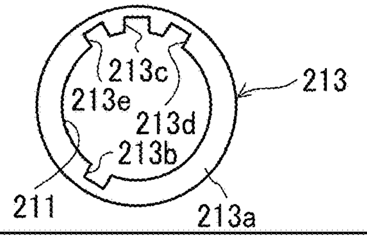
FIG. 10 is a table illustrating a shape of the fitting part of the liquid tank and the cleaning bottle according to a third embodiment.
Figure 10:
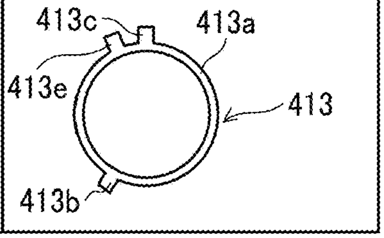

FIG. 10 is a table illustrating a shape of the fitting part of the liquid tank 21 and the cleaning bottle 40 according to the third embodiment.

Figure 11:
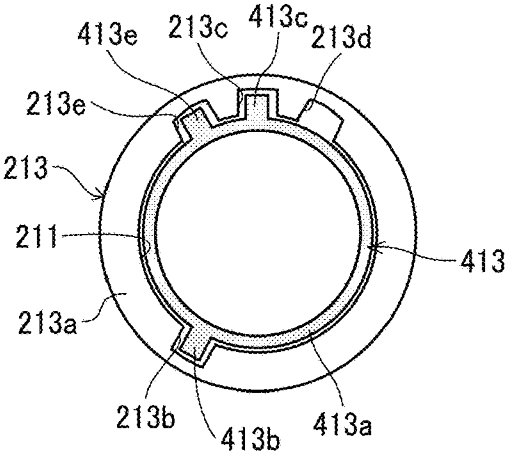
FIG. 11 is a schematic plan view of the cleaning bottle and the liquid tank in the fitted state according to the third embodiment of the present disclosure.

FIG. 11 is a schematic plan view of the cleaning bottle 40 and the liquid tank 21 in the fitted state according to the third embodiment of the present disclosure.

The first fitting part 213 of the liquid tank 21 according to the third embodiment further includes a recess 213*e* used for cleaning bottle 40 in addition to the recesses 213*b* to 213*d* in the first embodiment.

The third fitting part 413 for the cleaning bottle 40 includes a protrusion 413*e* to be fitted into the recess 213*e* of the liquid tank 21.

The second fitting part 313 of the refill bottle 30 does not have a protrusion that fits into the recess 213*e* of the first fitting part 213 of the liquid tank 21.

With such a configuration, the second fitting part 313 of the refill bottle 30 is finable only into the first fitting part 213 of the predetermined liquid tank 21 as illustrated in FIG. 9A. Conversely, the third fitting part 413 of the cleaning bottle 40 is fittable into the first fitting part 213 of any of the liquid tanks 21 as illustrated in FIG. 11.

That is, the third fitting part 413 of the cleaning bottle 40 containing the cleaning liquid 400 commonly supplied to each of the multiple liquid tanks 21 (liquid containers).

As a result, the same cleaning bottle 40 is used to supply the cleaning liquid 400 to the liquid tanks 21 of all colors. Thus, the printer 1 can improve workability of the supply operation of the cleaning liquid to supply the cleaning liquid 400 from the cleaning bottle 40 to the liquid tank 21.

Next, the printer 1 (liquid discharge apparatus) according to a fourth embodiment of the present disclosure is described with reference to FIGS. 12A and 12B.

Figure 12A:
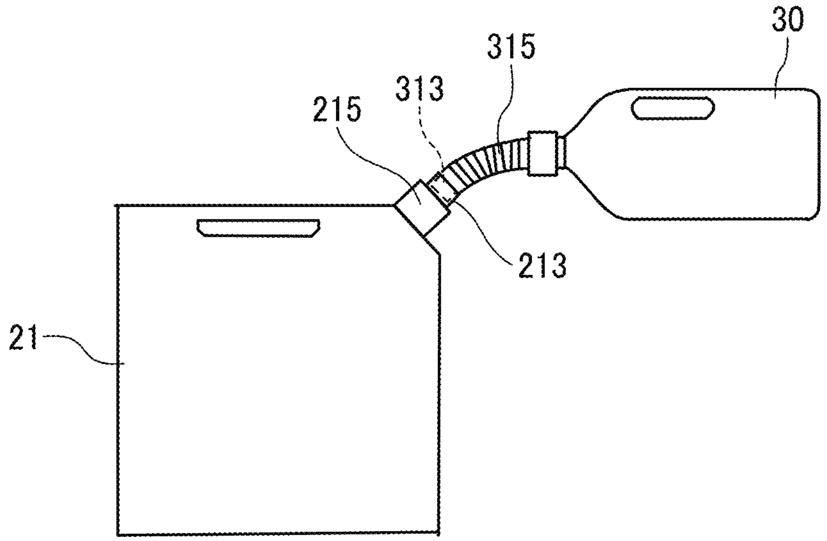
FIG. 12A is a schematic side view of the liquid tank and the refill bottle in a supply operation.

FIG. 12A is a schematic side view of the liquid tank 21 and the refill bottle 30 in the supply operation according to the fourth embodiment.

Figure 12B:
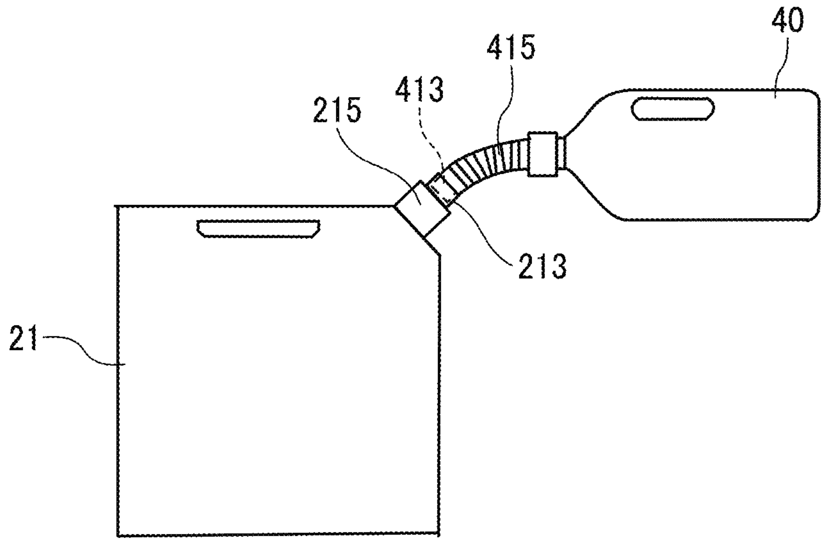
FIG. 12B is a schematic side view of the liquid tank and the cleaning bottle in the supply operation according to a fourth embodiment of the present disclosure.

FIG. 12B is a schematic side view of the liquid tank 21 and the cleaning bottle 40 in the supply operation according to the fourth embodiment.

The liquid tank 21 according to the fourth embodiment includes a first connector 215 having the first fitting part 213. The first connector 215 is attached to the inlet part 212 of the liquid tank 21. The first connector 215 is coupled to (communicated with) the inlet 211 of the tank body 210.

The first fitting part 213 of the liquid tank 21 is made as a member separated from the tank body 210 so that the tank body 210 can be made common to all the liquid tanks 21.

Further, the refill bottle 30 includes a second connector 315 formed by a bellows shaped hose. The second connector 315 includes a second fitting part 313 at a leading end of the second connector 315 as illustrated in FIG. 12A.

One end (right end in FIG. 12A) of the second connector 315 opposite to the second fitting part 313 is attached to the outlet part 312 of the refill bottle 30, and is coupled to (communicated with) the outlet 311 of the bottle body 310.

Thus, each of the multiple refill bottles 30 includes the outlet 311 from which one of the different types of inks 200 (liquids) is suppliable to corresponding one of the multiple liquid tanks 21 (liquid containers), and a second connector 315 coupled to the outlet 311, the second connector 315 including the second fitting part 313.

The second fitting part 313 of the refill bottle 30 is made as a member separated from the bottle body 310 so that the bottle body 310 can be made common to all the liquid tanks 21.

A liquid supply method includes following two processes to supply the ink 200 from the refill bottle 30 to the liquid tank 21. In a first process, the second fitting part 313 of the second connector 315 of the refill bottle 30 is fitted into the first fitting part 213 of the liquid tank 21. In a second process, the ink 200 is supplied from the refill bottle 30 to the liquid tank 21 via the second connector 315.

Further, the cleaning bottle 40 includes a third connector 415 formed by a bellows shaped hose. The third connector 415 includes a third fitting part 413 at a leading end of the third connector 415 as illustrated in FIG. 12B.

One end (right end in FIG. 12B) of the third connector 415 opposite to the third fitting part 413 is detachably attached to the outlet part 412 of the cleaning bottle 40, and is coupled to (communicated with) the outlet 411 of the bottle body 410.

Since the cleaning bottle 40 is common to all of the liquid tanks 21 of any color, a problem of the color mixture does not occur even if the third connector 415 and the bottle body 410 are stored separately. The third connector 415 is detachably attachable to the bottle body 410.

A cleaning liquid supply method includes following three processes to supply the cleaning liquid 400 from the cleaning bottle 40 to the liquid tank 21. In a first process, the third connector 415 is attached to the outlet part 412 of the cleaning bottle 40. In a second process, the third fitting part 413 of the third connector 415 of the cleaning bottle 40 is fitted into the first fitting part 213 of the liquid tank 21. In a third process, the cleaning liquid 400 is supplied from the cleaning bottle 40 to the liquid tank 21 via the third connector 415.

Next, the printer 1 (liquid discharge apparatus) according to a fifth embodiment of the present disclosure is described with reference to FIGS. 13A and 13B.

Figure 13A:
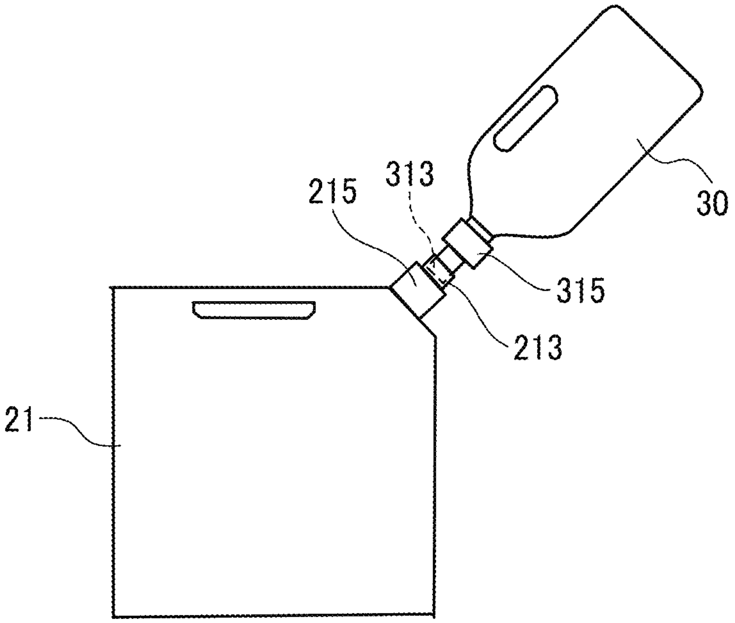
FIG. 13A is a schematic side view of the liquid tank and the refill bottle in the supply operation according to a fifth embodiment.

FIG. 13A is a schematic side view of the liquid tank 21 and the refill bottle 30 in the supply operation according to the fifth embodiment.

Figure 13B:
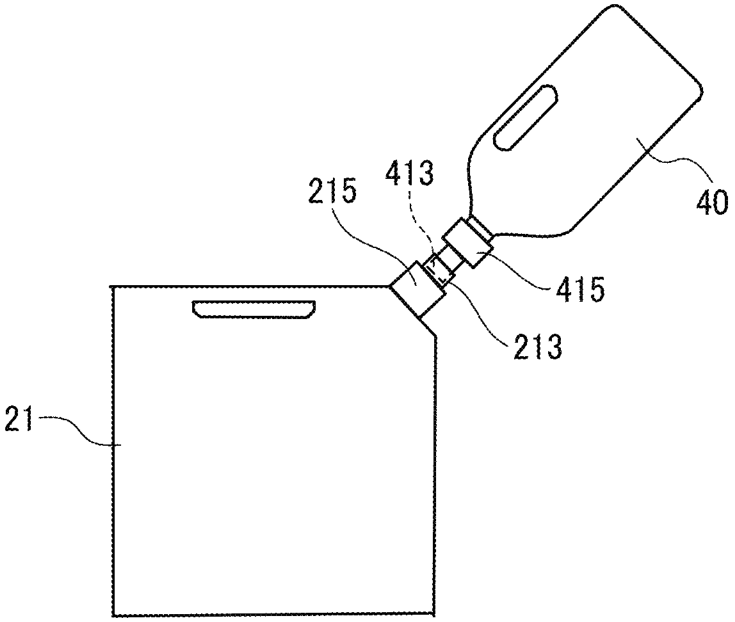
FIG. 13B is a schematic side view of the liquid tank and the cleaning bottle in the supply operation according to a fifth embodiment.

FIG. 13B is a schematic side view of the liquid tank 21 and the cleaning bottle 40 in the supply operation according to the fifth embodiment.

The printer 1 according to the fifth embodiment differs from the printer 1 according to the fourth embodiment (see FIGS. 12A and 12B) in that each of the second connector

315 of the refill bottle 30 and the third connector 415 of the cleaning bottle 40 is formed of a straight pipe.

Next, the printer 1 (liquid discharge apparatus) according to a sixth embodiment of the present disclosure is described with reference to FIGS. 14A and 14B.

Figure 14A:
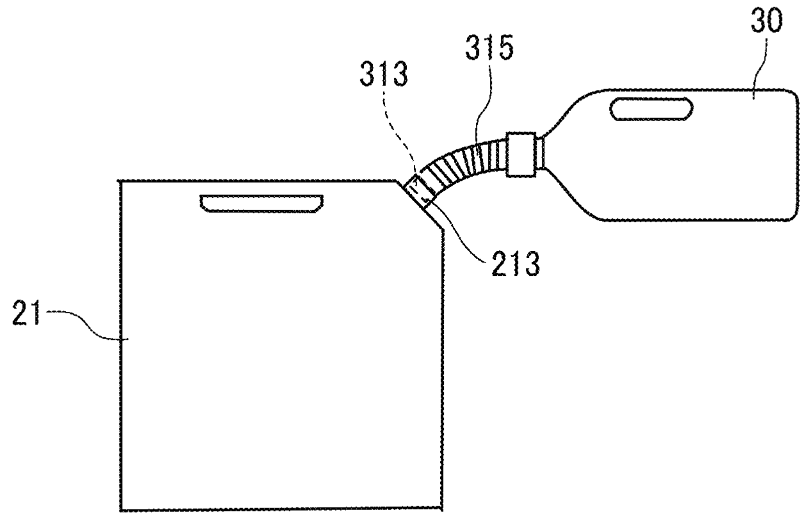
FIG. 14A is a schematic side view of the liquid tank and the refill bottle in the supply operation according to a sixth embodiment.

FIG. 14A is a schematic side view of the liquid tank 21 and the refill bottle 30 in the supply operation according to the sixth embodiment.

Figure 14B:
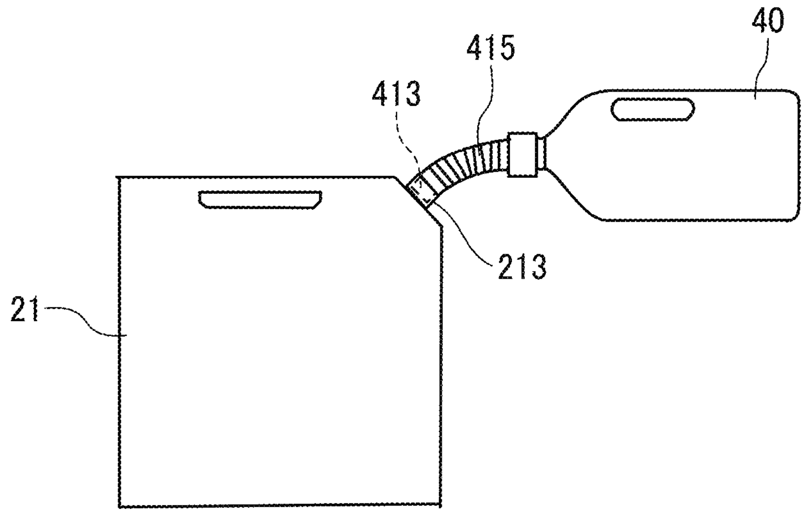
FIG. 14B is a schematic side view of the liquid tank and the cleaning bottle in the supply operation according to a sixth embodiment.

FIG. 14B is a schematic side view of the liquid tank 21 and the cleaning bottle 40 in the supply operation according to the sixth embodiment.

This liquid tank 21 according to the sixth embodiment is different from the liquid tank 21 according to the fourth embodiment (see FIG. 12A) in which the first fitting part 213 of the liquid tank 21 is provided on the tank body 210 as in the first embodiment (see FIG. 2A).

Next, the printer 1 according to a seventh embodiment of the present disclosure is described with reference to FIGS. 15A and 15B.

Figure 15A:
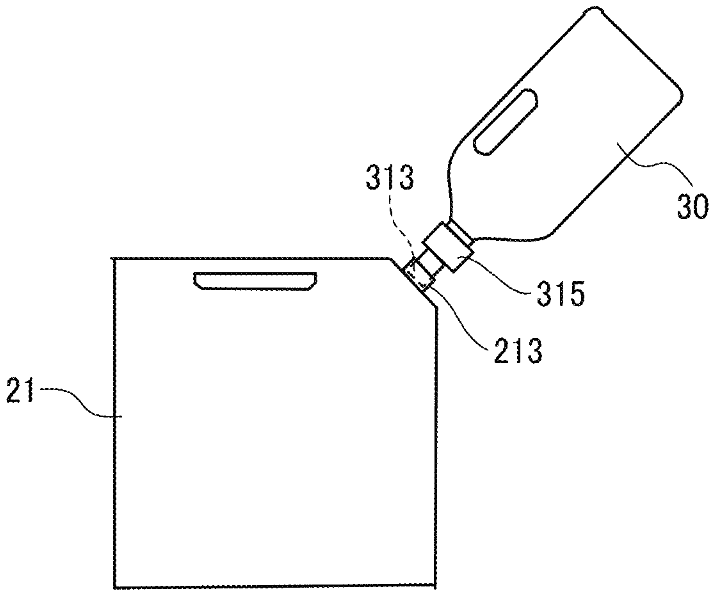
FIG. 15A is a schematic side view of the liquid tank and the refill bottle in the supply operation according to the seventh embodiment.

FIG. 15A is a schematic side view of the liquid tank 21 and the refill bottle 30 in the supply operation according to the seventh embodiment.

Figure 15B:
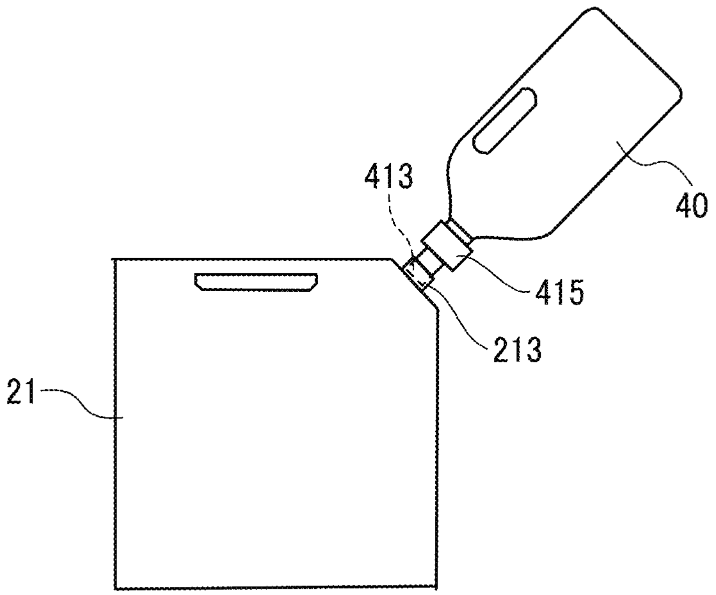

FIG. 15B is a schematic side view of the liquid tank 21 and the cleaning bottle 40 in the supply operation according to the seventh embodiment.

The printer 1 according to the seventh embodiment differs from the printer 1 according to the sixth embodiment (see FIGS. 14A and 14B) in that each of the second connector 315 of the refill bottle 30 and the third connector 415 of the cleaning bottle 40 is formed of a straight pipe.

The printer 1 (liquid discharge apparatus) according to an eighth embodiment of the present disclosure is described with reference to FIGS. 16 and 17.

Figure 16:
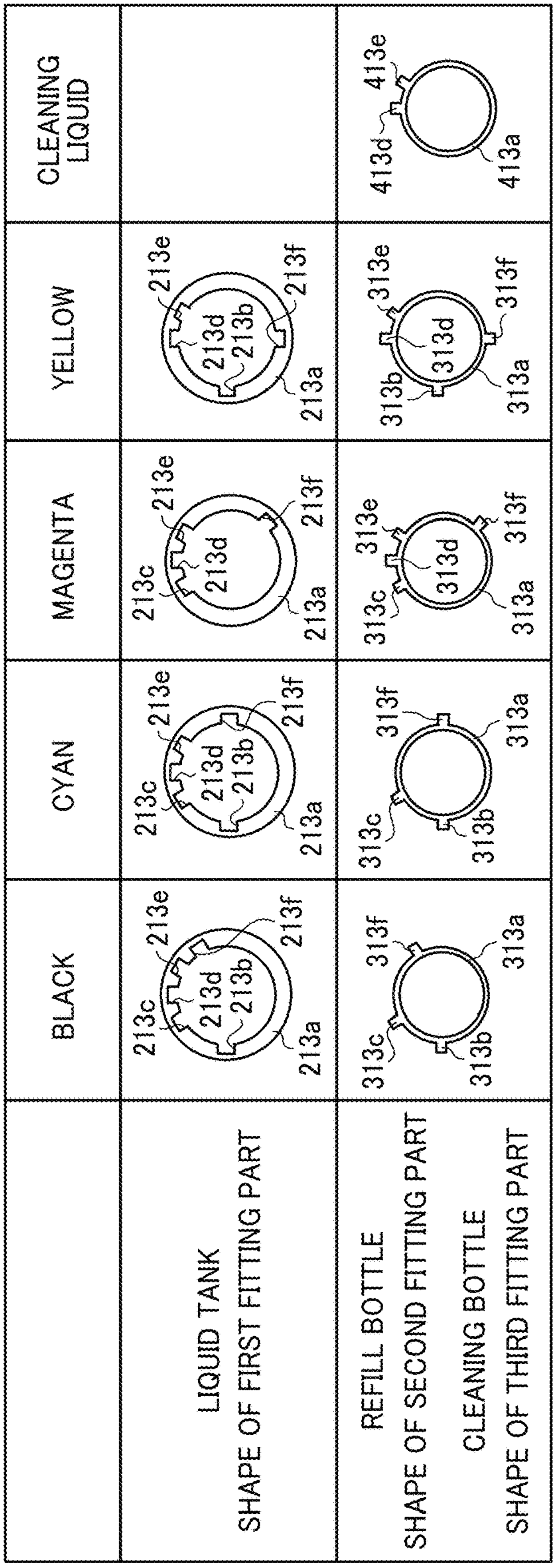
FIG. 16 is a table illustrating shapes of the fitting parts of the liquid tank, the refill bottle, and the cleaning bottle according to an eighth embodiment.

FIG. 16 is a table illustrating shapes of the fitting parts of the liquid tank 21, the refill bottle 30, and the cleaning bottle 40 according to the eighth embodiment.

Figure 17:
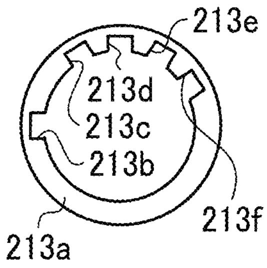
FIG. 17 is a table illustrating shapes of the fitting parts of the liquid tank, the refill bottle, and the cleaning bottle for black ink according to the eighth embodiment.
Figure 17:
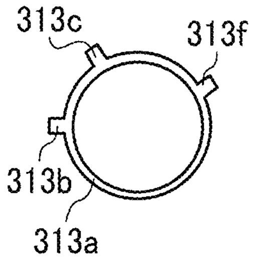
Figure 17:
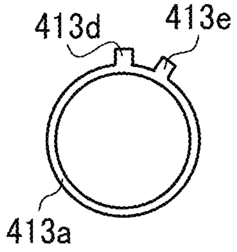

FIG. 17 is a table illustrating shapes of the fitting parts of the liquid tank 21, the refill bottle 30, and the cleaning bottle 40 for black ink according to the eighth embodiment.

In the printer 1 according to the eighth embodiment, the first fitting part 213 of the liquid tank 21 of black (K) ink includes five recesses 213*b* to 213*f*. The five recesses 213*b* to 213*f* are recessed in the radial direction from the inner wall surface of the cylindrical part 213*a*. Similarly, the first fitting part 213 of the liquid tank 21 of cyan (C) ink includes five recesses 213*b* to 213*f*. Similarly, the first fitting part 213 of the liquid tank 21 of magenta (M) ink includes four recesses 213*c* to 213*f*. Similarly, the first fitting part 213 of the liquid tank 21 of yellow (Y) ink includes four recesses 213*b*, and 213*d* to 213*f*.

Here, the circumferential positions of the recesses 213*d* and 213*e* of the first fitting part 213 are the same for the liquid tanks 21 of each color. Conversely, existence of the recesses 213*b* and 213*c* of each of the first fitting parts 213 and the circumferential position of the recesses 213*f* are different for the liquid tanks 21 of each color.

The second fitting part 313 of the refill bottles 30 selectively includes the protrusions 313*b* to 313*f* respectively fitted only to the corresponding recesses 213*b* to 213*f* of the first fitting part 213 of the liquid tank 21 of each color.

The third fitting part 413 of the cleaning bottle 40 includes the protrusions 413*d* and 413*e* respectively fitted into the recesses 213*d* and 213*e* of the first fitting part 213 the liquid tanks 21 of each color. The recesses 213*d* and 213*e* serve as common recesses common to all liquid tanks 21.

Thus, the third fitting part 413 of the cleaning bottle 40 is fitted to the first fitting part 213 of the liquid tank 21 of all colors so that the printer 1 according to the eighth embodiment can supply the cleaning liquid 400 to the liquid tank 21 of all colors As described above, the refill bottle 30 of some color (black and cyan in FIG. 16) may not use the recesses 213*d* and 213*e* of the liquid tank 21 serving as a common fitting part in the eighth embodiment. The liquid tank 21 includes the recesses 213*d* and 213*e* serving as a common fitting part used for cleaning bottle 40. The liquid tank 21 includes the recess that is not used by the protrusion of the refill bottle 30 for each color.

In each of the above embodiments, the first fitting part 213 includes recesses 213*b* to 213*f*, and the second fitting part 313 and the third fitting part 413 include the protrusions 313*b* to 313*f* and 413*b* to 413*e*. However, the recess and the protrusion may be reversed. The recess and the protrusion may be combined. Thus, the printer 1 can improve workability of the supply operation of the cleaning liquid.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge apparatus comprising:

multiple heads configured to respectively discharge different types of liquids; and multiple liquid containers configured to respectively contain the different types of liquids to be respectively supplied to the multiple heads, a cleaning bottle comprising a third connector comprising a third fitting part, each of the multiple liquid containers comprising a first connector, the first connector comprising:

a first fitting part fittable to each of:

a second fitting part of corresponding one of multiple refill bottles respectively containing the different types of liquids to be respectively supplied to the multiple liquid containers; and the third fitting part of the cleaning bottle containing a cleaning liquid to be supplied to each of the multiple liquid containers, wherein the third fitting part comprises A protrusions protruding in a radial direction from an outer wall surface of the third connector, the first fitting part comprises B recesses recessing in a radial direction from an inner wall surface of the first connector, A and B each are integers, and A is smaller than B, and the A protrusions are fittable into A recesses among the B recesses so that the third connector is connectable to the first connector of each of the multiple liquid containers.

2. The liquid discharge apparatus according to claim 1, wherein each of the multiple liquid containers further comprises:

an inlet to which one of the different types of liquids is suppliable; and the first connector coupled to the inlet, the first connector including the first fitting part.

3. The liquid discharge apparatus according to claim 1, wherein each of the multiple refill bottles further comprises:

an outlet from which one of the different types of liquids is suppliable to corresponding one of the multiple liquid containers; and a second connector coupled to the outlet, the second connector including the second fitting part.

4. The liquid discharge apparatus according to claim 1, wherein the cleaning bottle further comprises:

an outlet from which the cleaning liquid is suppliable to each of the multiple liquid containers; and the third connector coupled to the outlet, the third connector including the third fitting part.

5. A liquid container comprising:

multiple liquid containers configured to respectively contain different types of liquids to be respectively supplied to multiple heads, each of the multiple liquid containers comprising:

a container body configured to contain corresponding one of the different types of liquids; and a first connector comprising a first fitting part fittable to each of:

a second fitting part of corresponding one of multiple refill bottles respectively containing the different types of liquids to be respectively supplied to the multiple liquid containers; and a third fitting part of a cleaning bottle containing a cleaning liquid to be supplied to each of the multiple liquid containers, wherein the third fitting part comprises A protrusions protruding in a radial direction from an outer wall surface of a third connector of the cleaning bottle, the first fitting part comprises B recesses recessing in a radial direction from an inner wall surface of the first connector, A and B each are integers, and A is smaller than B, and the A protrusions are fittable into A recesses among the B recesses so that the third connector is connectable to the first connector of each of the multiple liquid containers.

6. The liquid container according to claim 5, wherein each of the multiple liquid containers further comprises:

an inlet to which one of the different types of liquids is suppliable; and the first connector coupled to the inlet, the first connector including the first fitting part.

7. A cleaning bottle comprising:

a bottle body configured to contain a cleaning liquid to be supplied to each of multiple liquid containers respectively including multiple first fitting parts having different shapes with each other; and a third connector comprising a third fitting part, the third fitting part directly fittable to each of the multiple first fitting parts of the multiple liquid containers, wherein the third fitting part comprises A protrusions protruding in a radial direction from an outer wall surface of the third connector, each of the first fitting parts comprises B recesses recessing in a radial direction from an inner wall surface of a first connector, A and B each are integers, and A is smaller than B, and the A protrusions are fittable into A recesses among the B recesses so that the third connector is connectable to the first connector of each of the multiple liquid containers.

8. The cleaning bottle according to claim 7, wherein the cleaning bottle further comprises:

an outlet from which the cleaning liquid is suppliable to each of the multiple liquid containers; and the third connector coupled to the outlet, the third connector including the third fitting part.

9. A liquid discharge apparatus comprising:

multiple heads configured to respectively discharge different types of liquids; and multiple liquid containers configured to respectively contain the different types of liquids to be respectively supplied to the multiple heads, a cleaning bottle comprising a third connector comprising a third fitting part, each of the multiple liquid containers comprising a first connector, the first connector comprising:

a first fitting part fittable to each of:

a second fitting part of corresponding one of multiple refill bottles respectively containing the different types of liquids to be respectively supplied to the multiple liquid containers; and the third fitting part of the cleaning bottle containing a cleaning liquid to be supplied to each of the multiple liquid containers, wherein the third fitting part of the cleaning bottle includes a cylindrical part having no protrusion on an outer wall surface of the third connector, the first fitting part comprises multiple recesses recessing in a radial direction from an inner wall surface of the first connector, and the cylindrical part of the third fitting part is fittable into the first fitting part so that the third connector is connectable to the first connector of each of the multiple liquid containers.

10. The liquid discharge apparatus according to claim 9, wherein each of the multiple liquid containers further comprises:

an inlet to which one of the different types of liquids is suppliable; and the first connector coupled to the inlet, the first connector including the first fitting part.

11. The liquid discharge apparatus according to claim 9, wherein each of the multiple refill bottles further comprises:

an outlet from which one of the different types of liquids is suppliable to corresponding one of the multiple liquid containers; and a second connector coupled to the outlet, the second connector including the second fitting part.

12. The liquid discharge apparatus according to claim 9, wherein the cleaning bottle further comprises:

an outlet from which the cleaning liquid is suppliable to each of the multiple liquid containers; and the third connector coupled to the outlet, the third connector including the third fitting part.

* * * * *